US011536627B2

United States Patent
Inagaki et al.

(10) Patent No.: US 11,536,627 B2
(45) Date of Patent: Dec. 27, 2022

(54) ABNORMALITY MONITORING DEVICE, ABNORMALITY MONITORING METHOD, AND CONTROL DEVICE

(71) Applicant: FANUC CORPORATION, Yamanashi (JP)

(72) Inventors: Keitarou Inagaki, Yamanashi (JP); Kazunori Iijima, Yamanashi (JP); Kazuhiro Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 635 days.

(21) Appl. No.: 16/510,881

(22) Filed: Jul. 13, 2019

(65) Prior Publication Data

US 2020/0041381 A1 Feb. 6, 2020

(30) Foreign Application Priority Data

Aug. 3, 2018 (JP) .............................. JP2018-146804

(51) Int. Cl.
*G01M 13/045* (2019.01)
*F16C 19/52* (2006.01)
*G05B 19/406* (2006.01)

(52) U.S. Cl.
CPC .......... *G01M 13/045* (2013.01); *F16C 19/525* (2013.01); *F16C 19/527* (2013.01); *G05B 19/406* (2013.01); *F16C 2233/00* (2013.01)

(58) Field of Classification Search
CPC .. G01M 13/045; G01M 13/02; G01M 13/021; G01M 13/028; F16C 19/525;

(Continued)

(56) References Cited

U.S. PATENT DOCUMENTS 3,582,928 A * 6/1971 Gaertner ................ G08B 21/20
 340/522
2002/0023496 A1* 2/2002 Ono .................... G01M 13/045
 73/593

(Continued)

FOREIGN PATENT DOCUMENTS

CN 105745835 A 7/2016
JP S60-232853 A 11/1985

(Continued)

OTHER PUBLICATIONS

An Office Action; "Notification of Reasons for Refusal," mailed by the Japanese Patent Office dated May 19, 2020, which corresponds to Japanese Patent Application No. 2018-146804 and is related to U.S. Appl. No. 16/510,881 with English language translation.

(Continued)

*Primary Examiner* — Daniel R Miller
*Assistant Examiner* — Eric Sebastian Von Wald
(74) *Attorney, Agent, or Firm* — Studebaker & Brackett PC

(57) ABSTRACT

To provide an abnormality monitoring device capable of reducing the size of a mounted device, enabling high-speed response, and achieving high accuracy in detecting abnormality. The abnormality monitoring device includes: at least one filter that extracts state information pertaining to drive of a mechanism of an industrial machine using a motor, as a signal of at least one frequency band; an integrator that integrates an output of the filter in each frequency band; and an abnormality detection unit that detects abnormality based on an integrated value integrated by the integrator. The state information may be control information of the controller that controls the motor or detection information from at least one detector attached to the mechanism.

6 Claims, 6 Drawing Sheets

(58) Field of Classification Search
CPC ........ F16C 19/00; F16C 19/527; F16C 19/52; F16C 2233/00; G05B 19/406; G05B 19/00; G05B 19/04; G05B 19/01; G05B 2219/42308; G05B 2219/34005; G05B 2219/34119; G05B 13/042; G05B 13/027; G05B 2219/37434; G05B 2219/33296; G05B 2219/37433; G05B 19/4142; G05B 2219/34013; G05B 2219/3743; G05D 3/1463; G05D 3/1445; G05D 3/183; H04L 7/0332; G01P 3/4805; G06N 3/0454; G06N 3/088; H02P 23/14; H02P 27/08

See application file for complete search history.

(56) References Cited

U.S. PATENT DOCUMENTS

| | | | |
|---|---|---|---|
| 2004/0139134 A1* | 7/2004 | Feather, Jr. | H04L 67/28 |
| | | | 708/300 |
| 2014/0121789 A1* | 5/2014 | Brandes | G05B 23/027 |
| | | | 700/80 |
| 2017/0117831 A1* | 4/2017 | Sato | H02P 3/18 |
| 2019/0147300 A1* | 5/2019 | Bathen | G06N 3/0454 |
| | | | 706/12 |
| 2021/0140849 A1* | 5/2021 | Tsutsui | F03D 17/00 |
| 2021/0175827 A1* | 6/2021 | Ohno | H02P 21/22 |

FOREIGN PATENT DOCUMENTS

| | | | | |
|---|---|---|---|---|
| JP | H04-372341 | A | | 12/1992 |
| JP | H04372341 | A | * | 12/1992 |
| JP | H05-312690 | A | | 11/1993 |
| JP | H08159928 | A | * | 6/1996 |
| JP | 2001-259972 | A | | 9/2001 |
| JP | 2007-336640 | A | | 12/2007 |
| JP | 2016-158315 | A | | 9/2016 |
| JP | 2018-088179 | A | | 6/2018 |
| JP | 2018-094686 | A | | 6/2018 |
| KR | 102068077 | B1 | * | 1/2020 |
| WO | 2006/030786 | A1 | | 3/2006 |
| WO | WO-2012176331 | A1 | * | 12/2012 ......... F02D 19/0636 |

OTHER PUBLICATIONS

An Office Action; "Notice of Reasons for Refusal," mailed by the Japanese Patent Office dated Oct. 6, 2020, which corresponds to Japanese Patent Application No. 2018-146804 and is related to U.S. Appl. No. 16/510,881 ; with English language translation.

An Office Action mailed by China National Intellectual Property Administration dated Jul. 29, 2022, which corresponds to Chinese Patent Application No. 201910706730.6 and is related to U.S. Appl. No. 16/510,881; with English language translation.

* cited by examiner

ORIGINAL SIGNAL

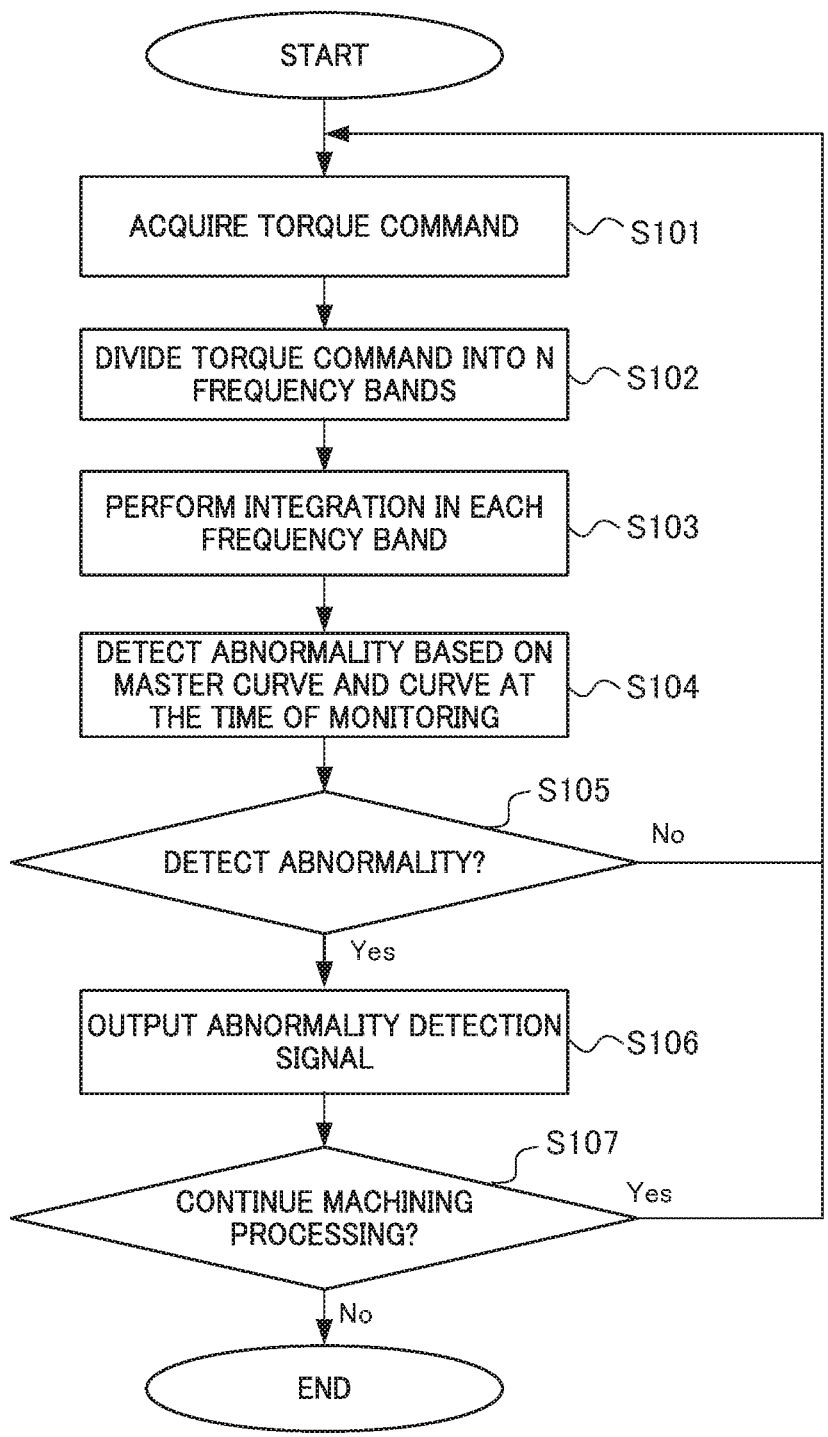

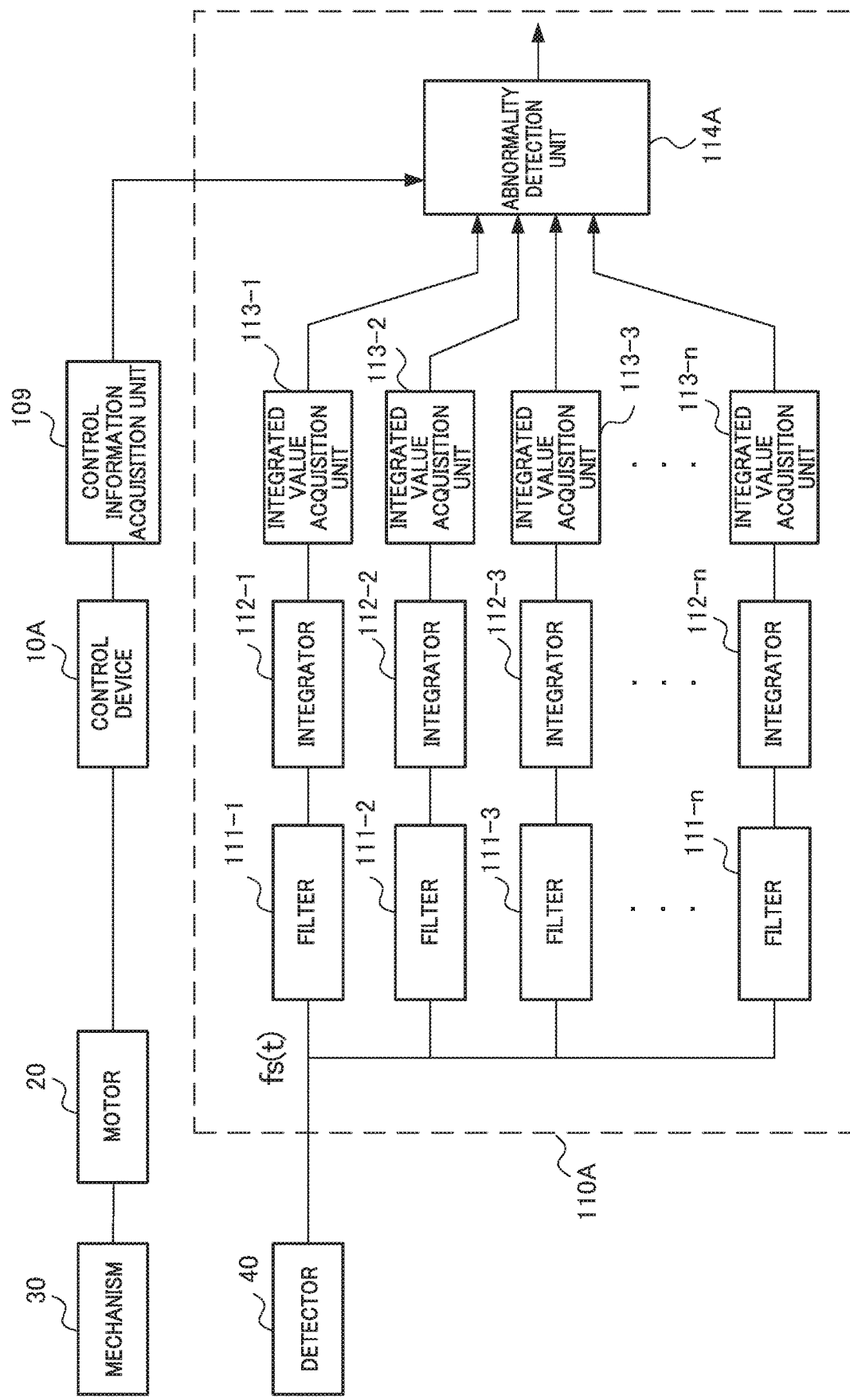

ABNORMALITY MONITORING DEVICE, ABNORMALITY MONITORING METHOD, AND CONTROL DEVICE

This application is based on and claims the benefit of priority from Japanese Patent Application No. 2018-146804, filed on 3 Aug. 2018, the content of which is incorporated herein by reference.

BACKGROUND OF THE INVENTION

Field of the Invention

The present invention relates to an abnormality monitoring device, an abnormality monitoring method, and a control device.

Related Art

An abnormality monitoring device for use in an industrial machine is disclosed in, e.g. Patent Documents 1 to 3. Patent Document 1 discloses an abnormality diagnostics device for use in machinery and equipment provided with a component that rotates or slides relative to a stationary member. The abnormality diagnostics device includes: a detection unit which is fixed to a rotating or sliding component or to a stationary member and which has a vibration sensor and a temperature sensor; and a signal processing unit for determining a state of the component based on a detection signal outputted from the detection unit. The signal processing unit includes: a comparison/collation unit for comparing a frequency component calculated based on a rotational velocity signal arising from damage to the component and a frequency component of actually measured data based on the signal detected by the vibration sensor; and an abnormality determination unit for determining presence or absence of abnormality of the component or identifying a damaged portion based on a result of comparison by the comparison/collation unit.

Patent Document 2 discloses a magnetic bearing device for a machining tool provided with an abnormality monitoring device. The magnetic bearing device is a magnetic bearing device for a machining tool, in which a main shaft is magnetically levitated from a fixed side by way of a magnetic radial bearing means and a magnetic thrust bearing means; the main shaft is rotationally driven by way of a motor means; and work machining is performed by way of a machining tool attached to an end portion of the main shaft; the magnetic bearing device comprises: a vibration detecting means for detecting vibration of the main shaft; a frequency-characteristics variable filter for extracting a vibration component synchronized with rotation from an output signal of the vibration detecting means; and a determining means for determining an abnormal state when the level of an output signal of the frequency-characteristics variable filter exceeds a prescribed level.

Patent Document 3 discloses a tool defect detection device serving as an abnormality monitoring device. The tool defect detection device includes: a tool load detection circuit for obtaining information on variation in load on a tool, in which the information includes variation due to a tilt of a workpiece with respect to a reference surface, variation in a relatively low frequency such as variation due to change in a cutting depth, variation when a cutting edge generates chips, sudden variation in output due to an abnormal phenomenon such as a defect in tool, and variation in a relatively high frequency such as variation due to resistance of a main shaft portion of a processing machine involved with rotation of the tool; and a signal processing circuit for detecting a portion having a large peak value in variation of a relatively high frequency based on the output from the tool load detection circuit, and outputting a signal indicating an occurrence of abnormality such as a tool defect. It is also disclosed therein that the signal processing circuit includes: an averaging circuit that only passes variation in a relatively low frequency; a subtracting circuit that subtracts an output of the averaging circuit from an output of the tool load detection circuit; and a comparing circuit that compares an output of the subtracting circuit with a reference set value for detecting a tool defect, and determines whether the output of the subtracting circuit exceeds the reference set value for detecting a tool defect. It is also disclosed therein that an integrating circuit for averaging fluctuations when chips are generated by the cutting edge may be provided between the subtracting circuit and the comparing circuit.

Patent Document 1: Pamphlet of PCT International Publication No. WO2006/030786

Patent Document 2: Japanese Unexamined Patent Application, Publication No. 2001-259972

Patent Document 3: Japanese Unexamined Patent Application, Publication No. S60-232853

SUMMARY OF THE INVENTION

When controlling rotation of a motor with a control device, if control information such as a torque command or detection information from a vibration sensor that detects vibration arising from degradation of a bearing that supports a spindle is directly introduced to determine abnormality of a mechanism driven by a servo motor, the scale of a mounted device increases, since a large-scale storage and computation circuit are required.

It is an object of the present invention to provide an abnormality monitoring device, an abnormality monitoring method, and a control apparatus, which allow for reducing the size of a mounted device, enabling high-speed response, and achieving high accuracy in detecting abnormality.

(1) An abnormality monitoring device according to the present invention is an abnormality monitoring device, including: at least one filter that extracts state information pertaining to drive of a mechanism of an industrial machine using a motor, as a signal of at least one frequency band; an integrator that integrates an output in each frequency band of the filter; and an abnormality detection unit that detects abnormality based on an integrated value integrated by the integrator.

(2) In the abnormality monitoring device of (1), the state information can be control information of the control device that controls the motor.

(3) In the abnormality monitoring device of (1), the state information can be detection information from at least one detector attached to the mechanism.

(4) In the abnormality monitoring device of (3), the abnormality detection unit can detect an abnormality value based on the integrated value and the control data of the control device that controls the motor.

(5) A control device according to the present invention is a control device that controls a motor that drives a mechanism of an industrial machine, the control device including the abnormality monitoring device described in (2).

(6) An abnormality monitoring method according to the present invention is an abnormality monitoring method, including extracting state information pertaining to drive of a mechanism of an industrial machine using a motor, as a signal of at least one frequency band, by using a filter; integrating an output in each frequency band of the filter by using an integrator; and detecting abnormality based on an integrated value integrated by the integrator.

According to the present embodiment, the size of a mounted device can be reduced, high-speed response is enabled, and high accuracy in detecting abnormality can be achieved.

BRIEF DESCRIPTION OF THE DRAWINGS

FIG. 7 is a flow chart showing an operation of the abnormality monitoring unit; and FIG. 8 is a block diagram showing a configuration of an abnormality monitoring system having a servo control device and an abnormality monitoring device.

DETAILED DESCRIPTION OF THE INVENTION

Hereinafter, embodiments of the present invention will be described in detail with reference to the drawings.

First Embodiment

Figure 1:
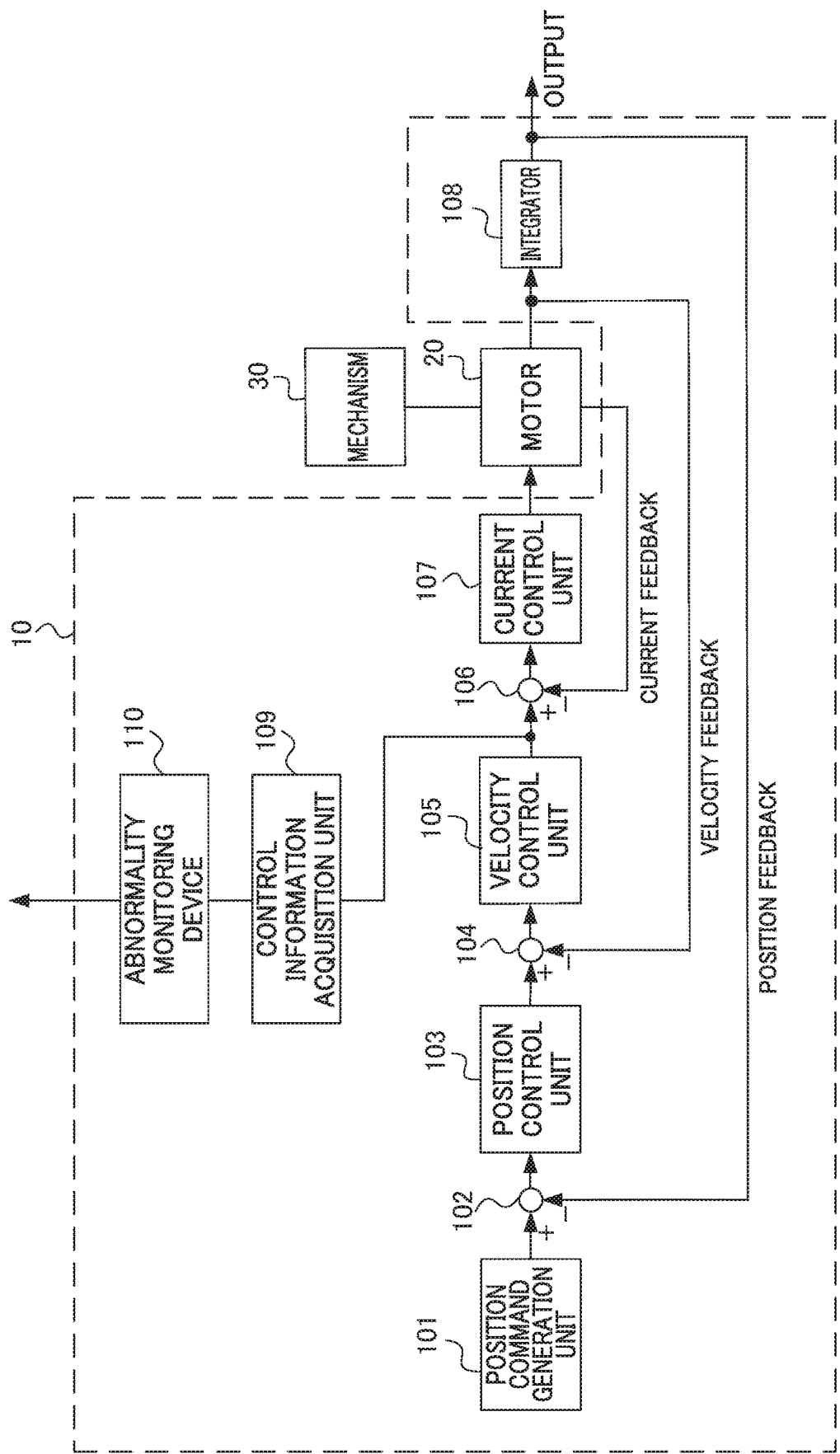
FIG. 1 is a schematic diagram showing a servo control device of a first embodiment of the present invention.

FIG. 1 is a block diagram showing a servo control device according to a first embodiment of the present invention. The servo control device 10 controls the rotation of a servo motor 20; and the servo motor 20 is included in an industrial machine and drives a mechanism 30 of the industrial machine. The servo control device 10 serves as a control device for controlling a motor for driving the mechanism of the industrial machine. The industrial machine is a machine tool, an industrial robot, a forging machine such as an electric pressing machine, an injection molding machine, or the like. The servo control device 10 together with the servo motor 20 may be included in the industrial machine.

The servo control device 10 includes a position command generation unit 101, a subtractor 102, a position control unit 103, a subtractor 104, a velocity control unit 105, a subtractor 106, a current control unit 107, an integrator 108, a control information acquisition unit 109, and an abnormality monitoring unit 110. The abnormality monitoring unit 110 serves as an abnormality monitoring device. The control information acquisition unit 109 and the abnormality monitoring unit 110 are provided herein as part of the servo control device 10, but may be provided separately from the servo control device 10.

The position command generation unit 101 generates a position command value; and the subtractor 102 obtains a difference between the position command value generated and the feedback position detection value, and outputs the difference as a position error to the position control unit 103.

The position command generation unit 101 generates a position command value based on a processing program for operating the servo motor 20. When the servo motor 300 drives a machine tool as an industrial machine, the mechanism 30 is, for example, a coupling mechanism for driving a spindle or a table on which a workpiece (work) is mounted. The connection mechanism is a coupling connected to the servo motor 20, a ball screw fixed to the coupling, and a nut screwed to the ball screw and connected to the table. The position command generation unit 101 generates a position command value by setting a feed speed such that the machining shape will be as specified by the machining program.

The subtractor 102 obtains a difference between the position command value and the feedback position detection value, and outputs the difference as a position error to the position control unit 103. The position control unit 103 outputs a value obtained by multiplying the position error by a position gain Kp to the subtractor 104 as a velocity command value.

The subtractor 104 obtains a difference between the velocity command value and the feedback velocity detection value, and outputs the difference as a velocity error to the velocity control unit 105. The velocity control unit 105 adds a value obtained by multiplying the velocity error by the integration gain K1v and a value obtained by multiplying the velocity error by the proportional gain K2v, and outputs the value added as a torque command value to the subtractor 106 and the control information acquisition unit 109.

The subtractor 106 obtains a difference between the torque command value and the feedback current detection value, and outputs the difference as a current error to the current control unit 107. The current control unit 107 obtains a current command value based on the current error, outputs the current command value to the servo motor 20, and drives the servo motor 20.

A rotational angular position of the servo motor 20 is detected by a rotary encoder, which is associated with the servo motor 20 and serves as a position detection unit; and the velocity detection value is inputted as velocity feedback to the subtractor 104. The velocity detection value is integrated by the integrator 108 to become a position detection value; and the position detection value is inputted to the subtractor 102 as position feedback. The current value flowing through the servo motor 20 is detected by a current sensor; and the current detection value is inputted as current feedback to the subtractor 106. When the industrial machine is a machine tool, and the servo motor 20 drives the table, a linear scale 304 may be attached to the end of a ball screw 3023, the linear scale 304 may detect a travelling distance of the ball screw 3023, and the detected distance may be used as position feedback.

Figure 2:
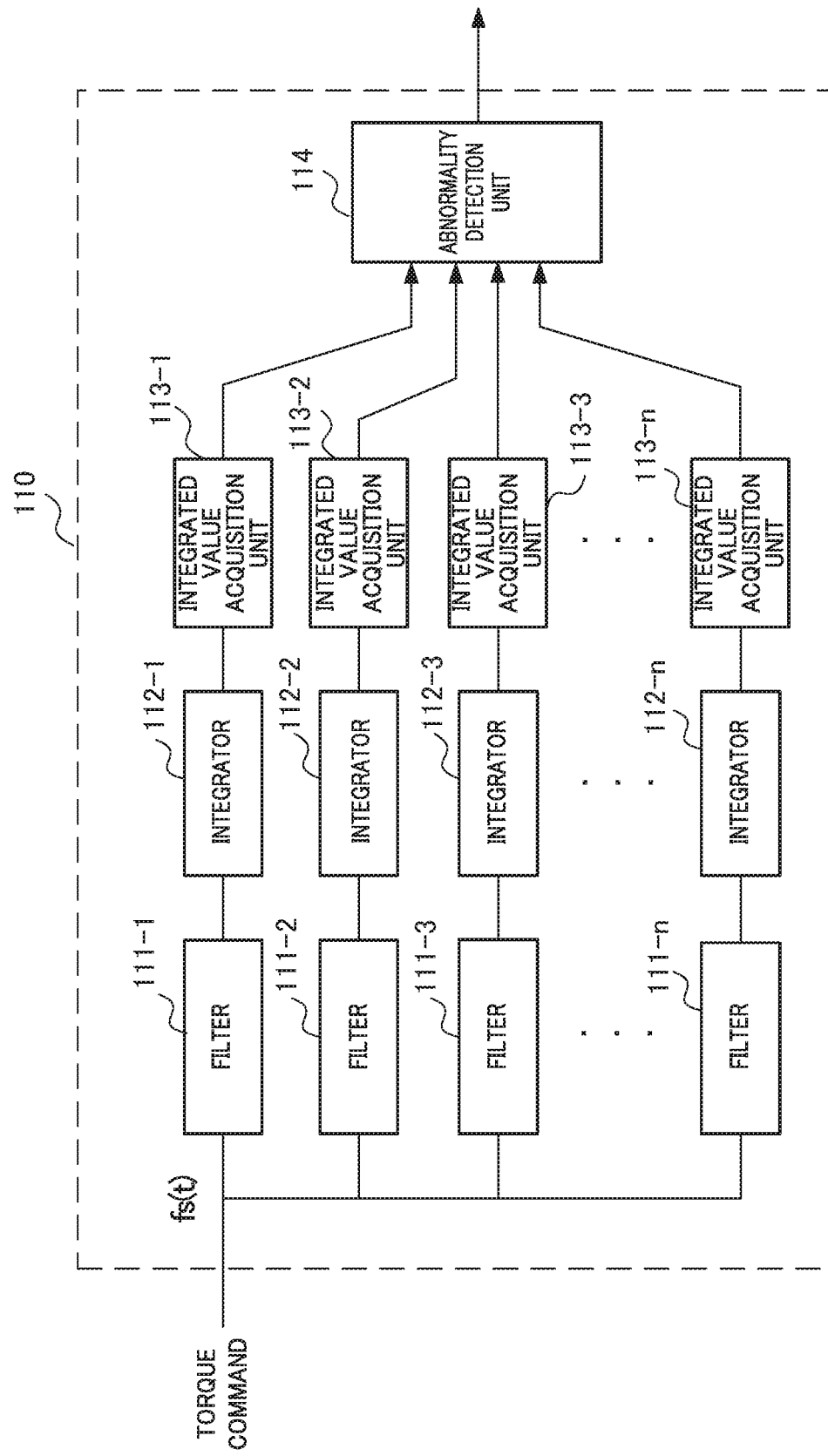
FIG. 2 is a block diagram showing a configuration of an abnormality monitoring unit.

The control information acquisition unit 109 acquires a torque command as control data from the subtractor 106, and sends the torque command to the abnormality monitoring unit 110. The control information serves as one of the state information indicating a state pertaining to the drive of the mechanism of the industrial machine using the motor. The state information indicating a state pertaining to the drive of the mechanism of the industrial machine using the motor is not limited to a torque command. For example, current information such as a current command value, position feedback information such as position error, and the like may be included. As for the control information acquired by the control information acquisition unit 109, for example, current information such as a current command value, position feedback information such as position error or the like may be acquired in addition to the torque command. The abnormality monitoring unit 110 determines abnormality by using the torque command outputted from the subtractor 106. FIG. 2 is a block diagram showing a configuration of the abnormality monitoring unit. As shown in FIG. 2, the abnormality monitoring unit 110 includes filters 111-1 to 111-$n$ ($n$ is a natural number), integrators 112-1 to 112-$n$, integrated value acquisition units 113-1 to 113-$n$, and an abnormality detection unit 114.

Figure 3:
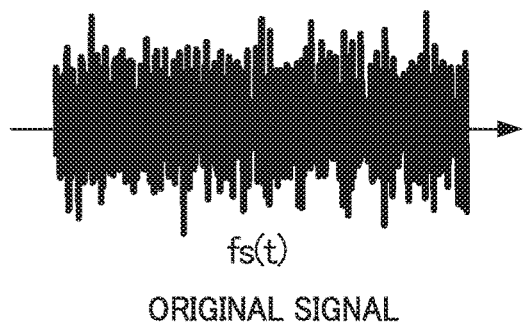
FIG. 3 is a waveform diagram showing a waveform fs(t) of a torque command.
Figure 4:
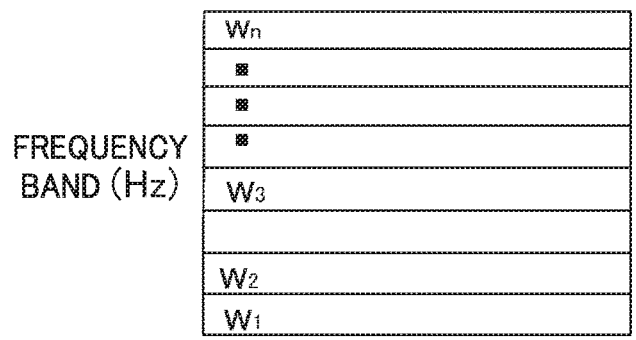
FIG. 4 is an explanatory diagram showing a state in which a torque command value is divided into n frequency bands.
Figure 5:
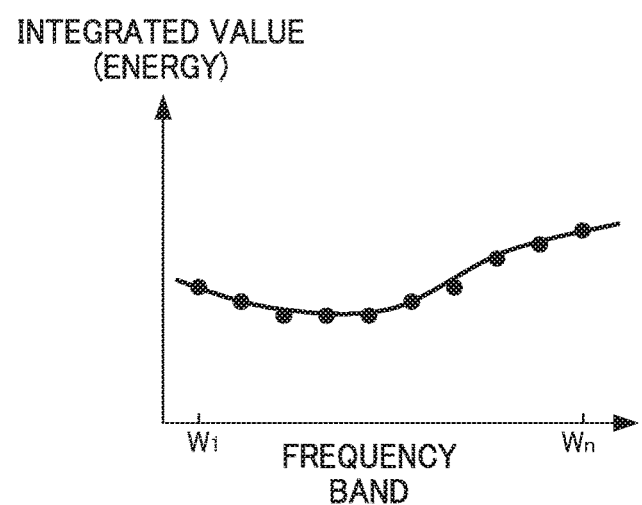
FIG. 5 is a characteristic diagram showing integrated values in n frequency bands, respectively.

The filters 111-1 to 111-$n$ divide the input torque command into n frequency bands and output the divided torque commands. FIG. 3 is a waveform diagram showing a waveform fs(t) of the torque command (serving as an original signal). FIG. 4 is an explanatory diagram showing a state in which the torque command value is divided into n frequency bands. The outputs of the filters 111-1 to 111-$n$ are integrated by the integrators 112-1 to 112-$n$ at a predetermined interval. The integrated value acquisition units 113-1 to 113-$n$ acquire integrated values from the integrators 112-1 to 112-$n$ and send the integrated values to the abnormality detection unit 114. FIG. 5 is a characteristic diagram showing integrated values (energy) in the n frequency bands, respectively.

The abnormality detection unit 114 detects whether abnormality exists based on a difference between a curve obtained by integration values in n frequency bands under a normal condition (referred to as a master curve) and a curve obtained by integration values in n frequency bands at the time of monitoring (as shown in FIG. 5). Upon detecting an abnormality signal, the abnormality detection unit 114 outputs an abnormality detection signal.

Figure 6:
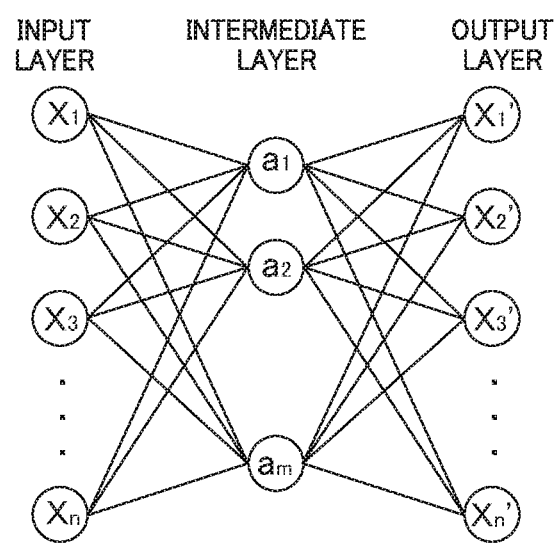
FIG. 6 is an explanatory diagram showing a configuration of an autoencoder.

The abnormality detection unit 114 can use an autoencoder. Documents disclosing an autoencoder include, for example, "Detection of Tool Wear Using Autoencoder", Study Report of Nagano Prefecture General Industrial Technology Center, No. 12, pp. 41-44 (2017). As shown in FIG. 6, the autoencoder includes an input layer, an intermediate layer and an output layer, and reproduces a signal inputted into the input layer at the output layer. FIG. 6 is an explanatory diagram showing a configuration of the autoencoder. The number of nodes is the same in the input layer and the output layer, while the number of nodes is smaller in the intermediate layer than in the input layer. In the intermediate layer, dimension compression is performed to extract characteristic points that best represent the characteristics of the input signal. The output layer performs dimensional decompression based on the extracted characteristics points. The method for dimensional compression and decompression is generated by repeating learning using the integrated values in n frequency bands when the industrial machine normally operates. The master curve under the normal condition can be obtained by learning by the autoencoder at the time of shipping the industrial machine. When data under a normal condition is inputted to the autoencoder having learned, since the characteristic points and the decompression method are conformable, decompression is appropriately performed. On the other hand, when abnormality data different from normal data is inputted, since the characteristic points which should essentially be extracted and the decompression method are also different, decompression cannot successfully be performed.

The equation for the intermediate layer of the autoencoder shown in FIG. 6 is shown as Equation 1. In Equation 1, W represents a weighting factor, and b represents a bias. f(x) is an activation function, using the Relu function. f(x)=max(0, x), outputting 0 when the input value is 0 or less, and outputting the input without change when the input value is larger than 1.

$$a_i = f\left(\sum_{j=1}^{n} W_{ij} x_j + b_i\right) \quad \text{[Math. 1]}$$

The autoencoder learns by varying the weighting factor W and the bias b so as to minimize the difference between the input and the output by using the training data, in which an integrated value (energy) in each of the n frequency bands is input and output.

In this manner, abnormality of the mechanism of the industrial machine can be detected by monitoring deviation in decompression by using the autoencoder generated by learning using normal data. Here, abnormality is detected by way of a degree of abnormality E of Equation 2. When the degree of abnormality E exceeds a predetermined threshold, it can be determined that abnormality exists. When the difference between the input value and the output value is large, the degree of abnormality E becomes a large value. In Equation 2, xi represents an input value, and xi' represents an output value.

$$E = \sqrt{\sum_{i=1}^{n} (xi' - xi)^2} \quad \text{[Math. 2]}$$

When detecting abnormality of the industrial machine, the abnormality monitoring unit 110 can use an integrated value of a current command, instead of an integrated value of a torque command. An integrated value of a torque command can be combined with an integrated value of a current command and/or position error serving as position feedback information. In this case, the control information may be combined with an evaluation value calculated by way of a predetermined evaluation function at a predetermined interval. That is, the abnormality monitoring unit 110 can detect abnormality by using the control data such as a torque command, a current command, or position error of the servo control device 10. In FIG. 1, a current command is an output of the current control unit 107; and position error is an output of the subtractor 102. Although it may be difficult to determine normality or abnormality only by an integral value of a torque command, accuracy of abnormality determination can be improved by determining abnormality by combining an integral value of a current command and/or position error serving as position feedback information, in addition to an integral value of a torque command as described above.

FIG. 7 is a flow chart showing an operation of the abnormality monitoring unit. In Step S101, the abnormality monitoring unit 110 acquires a torque command as control data. In Step S102, the filters 111-1 to 111-$n$ divide the torque command into n frequency bands.

Next, in Step S103, the integrators 112-1 to 112-$n$ perform integration in each of the n frequency bands at a predetermined interval. The abnormality detection unit 114 detects whether abnormality exists based on the master curve and the curve at the time of monitoring in Step S104, determines whether abnormality exists in Step S105, and outputs an abnormality detection signal in Step S106 when determining that abnormality exists. If it is determined that abnormality does not exist, the processing returns to Step S101.

Next, after outputting the abnormality detection signal, it is determined whether the machining processing of the industrial machine should be continued in Step S107; if it is continued, the processing returns to step S101, and if it is not continued, the abnormality monitoring operation is terminated.

When abnormality of the industrial machine is detected by using control information, if abnormality is detected by directly introducing control information, the scale of a mounted device for achieving the abnormality monitoring device becomes large (the scale of AD, communication path band, storage, CPU, GPU, etc. becomes large). As in the present embodiment, by dividing the control information into a predetermined number of frequency bands and performing integration in each frequency band at a predetermined interval, the amount of information can be compressed without impairing the content of information. A large-scale storage or calculation circuits become unnecessary, and preprocessing is achieved by small substrates and microcomputers; therefore, the entire system can be downsized and become highly responsive while maintaining high accuracy in detecting abnormality.

Second Embodiment

In the first embodiment, abnormality of the industrial machine is detected by using control data such as a torque command value, a current command value, or a position detecting value of the servo control device 10. The present embodiment describes an abnormality monitoring system having an abnormality monitoring device for detecting abnormality by using control information of a servo control device and detection information of a detector. The control information and the detection information serve as state information indicating a state pertaining to the drive of the mechanism of the industrial machine using the motor.

FIG. 8 is a block diagram showing a configuration of an abnormality monitoring system including a servo control device and an abnormality monitoring device. As shown in FIG. 8, the abnormality monitoring system includes a servo control device 10A, a control information acquisition unit 109, an abnormality monitoring unit 110A serving as an abnormality monitoring device, a servo motor 20, a mechanism 30 of an industrial machine, and a detector 40. Although the servo control device 10 shown in FIG. 1 internally includes the control information acquisition unit 109 and the abnormality monitoring unit 110, the servo control device 10A of the present embodiment does not include the control information acquisition unit 109 and the abnormality monitoring unit 110. The abnormality monitoring unit 110A has the same configuration as the abnormality monitoring unit 110 shown in FIG. 2 except that an output of the detector 40 is inputted into the filters 111-1 to 111-$n$, and that, in addition to the output from the integrated value acquisition units 113-1 to 113-$n$, control information such as a torque command is inputted into the abnormality detection unit 114A from the control information acquisition unit 109. The control information acquisition unit 109 may be provided inside the servo control device 10A.

The detector 40 is a sensor for observing the state of the mechanism 30 or the servo motor 20 of the industrial machine. For example, an acoustic emission (AE) sensor, a vibration sensor, or a temperature sensor. The AE sensor is a sensor for detecting an elastic wave generated when an external force acts on a material and breaks, or when friction or collision occurs at an interface between materials, and detects, for example, a case where cutting becomes unstable due to adhesion of a workpiece to a cutting edge of a tool. The vibration sensor detects vibration due to deterioration of a component, for example, deterioration of a bearing that supports a main shaft. The temperature sensor measures and outputs temperature in the vicinity of the main shaft or the motor.

The information detected by the detector 40 is inputted into the filters 111-1 to 111-$n$. Outputs of the filters 111-1 to 111-$n$ are integrated by the integrators 112-1 to 112-$n$ at a predetermined interval; and the integrated values are inputted into the abnormality detection unit 114 A via the integrated value acquisition units 113-1 to 113-$n$. Control data such as a torque command value from the control information acquisition unit 109 is inputted into the abnormality detection unit 114A. Similar to the abnormality detection unit 114, the abnormality detection unit 114A detects whether abnormality exists based on a difference between the curve obtained by the integration values in n frequency bands under a normal condition (referred to as a master curve) and a curve obtained by integration values in n frequency bands at the time of monitoring, and obtains a first detection result. The abnormality detection unit 114 detects whether abnormality exists based on control data such as a torque command value, and obtains a second detection result. When both the first and second detection results are abnormal, the abnormality detection unit 114 outputs an abnormality detection signal. Flow of an operation of the abnormality monitoring unit is the same as the flow of the operation in which the torque command is replaced with detection data of the detector 40 in FIG. 7.

Monitoring of abnormality of the mechanism of the industrial machine can be performed by using sensing information (sensor information) from an AE sensor, a vibration sensor, or a temperature sensor. However, when abnormality monitoring is performed by only using one sensor data, there is a possibility that erroneous determination may occur due to influence of sensor noise or the like. The monitoring of abnormality of the mechanism of the industrial machine can also be performed by using control information of the control device (a torque command, a current command, position feedback information, etc.), which can be relatively easily obtained as accurate information. For example, although the case such as the torque command value rising can be determined as abnormal, the case such as the processing load rising may be difficult to be determined as normal or abnormal.

Therefore, accuracy of abnormality determination can be improved by acquiring control information of the control device and monitoring abnormality of the mechanism in combination with the sensor information such as the AE sensor. For example, if the AE sensor also detects abnormality when the processing load rises, the AE sensor can accurately determine that abnormality (collision or the like) that causes deformation of a machine, a tool or the like has occurred.

In the present embodiment, when detection information is directly introduced for determination, the scale of a mounted device for achieving the abnormality determination device becomes large. Therefore, similar to the first embodiment, in the present embodiment as well, by dividing detection information into a predetermined number of frequency bands and performing integration in each frequency band at a predetermined interval, the amount of information can be compressed without impairing the content of information. When the control information and the detection information are used in combination, if the control information is directly introduced for determination, the scale of a mounted device for achieving the abnormality determination device becomes large. Similar to the first embodiment, in the present embodiment as well, by dividing the control information into a predetermined number of frequency bands and performing integration in each frequency band at a predetermined interval, the amount of information can be compressed without impairing the content of information. As described above, by calculating an evaluation value for each control information at a predetermined interval by using a predetermined evaluation function, the evaluation value may be used. A large-scale storage or calculation circuits become unnecessary, and preprocessing is achieved by small substrates and microcomputers; therefore, the entire system can be downsized and become highly responsive while maintaining high accuracy in detecting abnormality.

In the present embodiment, abnormality of the industrial machine is detected by using the detection information from the detector and the control information of the servo control device 10; however, abnormality of the industrial machine may be detected by only using the detection information from the detector without using the control information of the servo control device 10.

The functional blocks included in the servo control device 10, 10A and the abnormality monitoring unit 110A have been described above. In order to achieve these functional blocks, each of the servo control device 10, 10A and the abnormality monitoring unit 110A includes a processing unit such as a Central Processing Unit (CPU). Each of the servo control device 10, 10A, and the abnormality monitoring unit 110A also includes a secondary storage device such as a hard disk drive (HDD) storing various control programs such as application software and operating system (OS), and a main storage device such as a random access memory (RAM) for storing data temporarily required for the processing unit to execute the program.

In each of the servo control device 10, 10A and the abnormality monitoring unit 110A, the processing unit reads application software and OS from the secondary storage device, and performs computation based on the application software and OS, while deploying the application software and OS thus read in the main storage device. Based on a result of the computation, various types of hardware included in each device are controlled. As a result, the functional blocks of the present embodiment are achieved. That is, the present embodiment can be achieved by cooperation of hardware and software.

Since a large amount of computation is associated with machine learning in relation to the abnormality monitoring unit 110 and 110A, high-speed processing can favorably be achieved by, for example, mounting Graphics Processing Units (GPU) on a personal computer and using the GPU for computation associated with machine learning by way of a technique referred to as General-Purpose computing on Graphics Processing Units (GPGPU). Further, in order to perform higher-speed processing, a computer cluster may be constructed by using a plurality of computers having such GPUs mounted thereon, and parallel processing may be performed by the plurality of computers included in the computer cluster.

Each configuration included in a servo control unit and a machine-learning device of the above-described servo control device can be achieved by hardware, software or combination thereof. A servo control method jointly performed by the respective components included in the above-described servo control device can also be achieved by hardware, software or combination thereof. Here, being achieved by software means being achieved by a computer reading and executing a program.

The program can be stored and provided to the computer by using various types of non-transitory computer readable media. The non-transitory computer readable media include various types of tangible storage media. Examples of non-transitory computer readable media include magnetic recording media (e.g. hard disk drive), magneto-optical recording media (e.g. magneto-optical disk), CD-ROM (Read Only Memory), CD-R, CD-R/W, semiconductor memory (e.g. mask ROM, PROM (Programmable ROM), EPROM (Erasable PROM), flash ROM, and RAM (Random Access Memory). The programs may also be supplied to the computer by way of various types of transitory computer readable media.

Although the above-described embodiments are preferred embodiments of the present invention, the present invention is not limited to the above-described embodiments, and can be implemented in the form of various modifications without departing from the spirit of the present invention. For example, in the first embodiment, the abnormality monitoring unit 110 may be provided separately from the servo control device 1 and communicatively connected to the servo control device 1 via a network. In the second embodiment, the abnormality monitoring unit 110A may be communicatively connected to the detector 40 and the control information acquisition unit 109 via a network. The network may be, for example, a local area network (Local Area Network) constructed in a factory, the Internet, a public telephone network, or combination thereof. There is no particular limitation on a specific communication method in the network, whether it is a wired connection or a wireless connection, or the like.

EXPLANATION OF REFERENCE NUMERALS

10 servo control device
20 servo motor
30 mechanism
40 detector
101 position command generation unit
102 subtractor
103 position control unit
104 subtractor
105 velocity control unit
106 subtractor
107 current control unit
108 integrator
109 control information acquisition unit
110, 110a abnormality monitoring unit

What is claimed is:

1. An abnormality monitoring device, comprising:
   at least one filter that extracts state information pertaining to drive of a mechanism of an industrial machine using a motor, as a signal of at least one frequency band;
   at least one integrator that integrates an output of the at least one filter in each frequency band for a predetermined time period; and
   an abnormality detection unit that generates a curve based on an integrated value integrated by the at least one integrator and detects abnormality of the industrial machine by comparing the generated curve with a master curve, the master curve being obtained based on an integrated value integrated by the at least one integrator under a normal condition.

2. The abnormality monitoring device according to claim 1, wherein the state information is control information of a control device that controls the motor.

3. The abnormality monitoring device according to claim 1, wherein the state information is detection information from at least one detector attached to the mechanism.

4. The abnormality monitoring device according to claim 3, wherein the abnormality detection unit detects an abnormality value based on the integrated value and the control data of a control device that controls the motor.

5. A control device that controls a motor that drives a mechanism of an industrial machine, the control device comprising:
   an abnormality monitoring device including:
      at least one filter that extracts state information pertaining to drive of a mechanism of an industrial machine using a motor, as a signal of at least one frequency band, the state information being control information of the control device that controls the motor;
      at least one integrator that integrates an output of the at least one filter in each frequency band for a predetermined time period; and
      an abnormality detection unit that generates a curve based on an integrated value integrated by the at least one integrator and detects abnormality of the industrial machine by comparing the generated curve with a master curve, the master curve being obtained based on an integrated value integrated by the at least one integrator under a normal condition.

6. An abnormality monitoring method, comprising:
   extracting state information pertaining to drive of a mechanism of an industrial machine using a motor, as a signal of at least one frequency band, by using at least one filter;
   integrating an output of the at least one filter in each frequency band for a predetermined period of time by using the at least one integrator;
   generating a curve based on an integrated value integrated by the at least one integrator; and
   detecting abnormality of the industrial machine by comparing the generated curve with a master curve, the master curve being obtained based on an integrated value integrated by the at least one integrator under a normal condition.

* * * * *